(12) United States Patent
Llosa et al.

(10) Patent No.: US 11,020,993 B2
(45) Date of Patent: Jun. 1, 2021

(54) DETERMINATIONS OF LENGTHS OF WEB MEDIAS

(71) Applicant: HEWLETT-PACKARD DEVELOPMENT COMPANY, L.P., Spring, TX (US)

(72) Inventors: Ramon Llosa, Sant Cugat del Valles (ES); Javier Maqueda Castellote, Sant Cugat del Valles (ES); Jorge Espert Cervera, Sant Cugat del Valles (ES); Roger Casasayas Panella, Sant Cugat del Valles (ES)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

(21) Appl. No.: 16/611,242

(22) PCT Filed: Jul. 28, 2017

(86) PCT No.: PCT/US2017/044445
§ 371 (c)(1),
(2) Date: Nov. 6, 2019

(87) PCT Pub. No.: WO2019/022772
PCT Pub. Date: Jan. 31, 2019

(65) Prior Publication Data
US 2020/0156390 A1    May 21, 2020

(51) Int. Cl.
*B41J 15/04* (2006.01)
*B65H 26/06* (2006.01)
(Continued)

(52) U.S. Cl.
CPC ........... *B41J 15/04* (2013.01); *B41J 11/0075* (2013.01); *B65H 26/06* (2013.01);
(Continued)

(58) Field of Classification Search
CPC ....... B41J 15/04; B41J 11/0075; B65H 26/06; B65H 2301/41522; B65H 11/114;
(Continued)

(56) References Cited

U.S. PATENT DOCUMENTS 5,816,165 A    10/1998    Huston
5,935,361 A *  8/1999    Takahashi ............ B65H 19/102
                                                156/159
(Continued)

FOREIGN PATENT DOCUMENTS

EP    1827851 B1    8/2010
JP    05092216 A    4/1993
(Continued)

OTHER PUBLICATIONS

TM-U325D/U325PD—User's Manual < https://www.umd.com.au/downloads/epson_tmu325.pdf>.

*Primary Examiner* — Sharon Polk
(74) *Attorney, Agent, or Firm* — HP Inc. Patent Department

(57) ABSTRACT

An example media handling system includes a web media holder with a core hub capable of coupling to a core of a web media roll, a sensor to take a measurement at the circumferential surface of the web media roll, and a controller to determine a length of the web media roll. In that example, the controller may determine the length of the web media roll based on a first distance measurable by the sensor when the core hub is in a first orientation, a second distance measureable by the sensor when the core hub is in a second orientation after a number of rotations with respect to the first orientation of the core hub, and reference value corresponding to the core.

13 Claims, 5 Drawing Sheets

(51) Int. Cl.
   *B41J 11/00*   (2006.01)
   *G01B 21/02*   (2006.01)

(52) U.S. Cl.
   CPC .............. *B65H 2301/41522* (2013.01); *B65H 2511/11* (2013.01); *B65H 2511/114* (2013.01); *B65H 2511/13* (2013.01); *B65H 2513/114* (2013.01); *G01B 21/02* (2013.01)

(58) Field of Classification Search
   CPC ............ B65H 2511/11; B65H 2511/13; B65H 2513/114; G01B 21/02
   See application file for complete search history.

(56) References Cited

U.S. PATENT DOCUMENTS

| | | |
|---|---|---|
| 6,823,917 B2 | 11/2004 | Dods |
| 7,480,081 B2 | 1/2009 | Otsuki |
| 7,674,054 B2 | 3/2010 | Vorhees |
| 2001/0000462 A1 | 4/2001 | Blackman et al. |
| 2006/0012665 A1 | 1/2006 | Yoo |
| 2007/0146457 A1 | 6/2007 | Kito |
| 2009/0283565 A1* | 11/2009 | Ibanez .................... G01B 7/026 226/10 |
| 2010/0230527 A1 | 9/2010 | Ray et al. |
| 2012/0055272 A1 | 3/2012 | Sanada et al. |
| 2015/0343799 A1 | 12/2015 | Sanada et al. |
| 2018/0079233 A1* | 3/2018 | d'Armancourt ..... B41J 11/0075 |
| 2019/0153672 A1* | 5/2019 | Shitara ............... G01B 11/0691 |
| 2019/0287431 A1* | 9/2019 | Yamada ................... B41J 11/42 |

FOREIGN PATENT DOCUMENTS

| | | |
|---|---|---|
| JP | 09020443 A | 1/1997 |
| JP | 2000255860 A | 9/2000 |
| JP | 2006199003 A | 8/2006 |
| JP | 2006327066 A | 12/2006 |
| JP | 2007260991 A | 10/2007 |
| JP | 2014139102 A | 7/2014 |

* cited by examiner

DETERMINATIONS OF LENGTHS OF WEB MEDIAS

BACKGROUND

Images are processed for use with computing machines, such as a print apparatus. A print apparatus, for example, may use control data based on processed image data to reproduce a physical representation of an image by operating a print fluid ejection system according to the control data. A print apparatus may eject print fluid on to web media that is storeable in a roll for large format prints.

DETAILED DESCRIPTION

In the following description and figures, some example implementations of print apparatus, media handling systems, and/or methods of operating a print apparatus are described. In examples described herein, a "print apparatus" may be a device to print content on a physical medium (e.g., paper, textiles, a layer of powder-based build material, etc.) with a print material (e.g., ink or toner). For example, the print apparatus may be a wide-format print apparatus that prints latex-based print fluid on a print medium, such as a print medium that is size A2 or larger. In some examples, the physical medium may printed on from a web roll or as pre-cut sheet. A print apparatus may utilize suitable print consumables, such as ink, toner, fluids or powders, or other raw materials for printing. An example of fluid print material is a water-based latex ink ejectable from a print head, such as a piezoelectric print head or a thermal inkjet print head. Other examples of print fluid may include dye-based color inks, pigment-based inks, solvents, gloss enhancers, fixer agents, and the like.

Large prints may be printed on a web roll, which may allow for dynamic lengths of print jobs. The web roll may unwind to provide substrate to be printed on. The web roll may be interchangeable with other web rolls, such as changing a web roll for using a different type of substrate. Web media may come in a variety of types, size, thickness, etc. A printer user may manually track the amount of media left on a used roll, or may fail to do so. The user may also track or rely on average characteristics to know the thickness of the media.

Various examples described below relate to identifying a length of media of used web media roll based on the thickness of the media and tracking the media during a number of rotations. The thickness of a media may be determined by tracking the distance measured with respect to a circumferential surface of the web roll and making a calculation of the thickness based on the amount of rotation to obtain that distance. By knowing the thickness, and the size of the roll core, and the radius of total media roll, the remaining length of media available to be printed on is able to be calculated.

Figure 1:
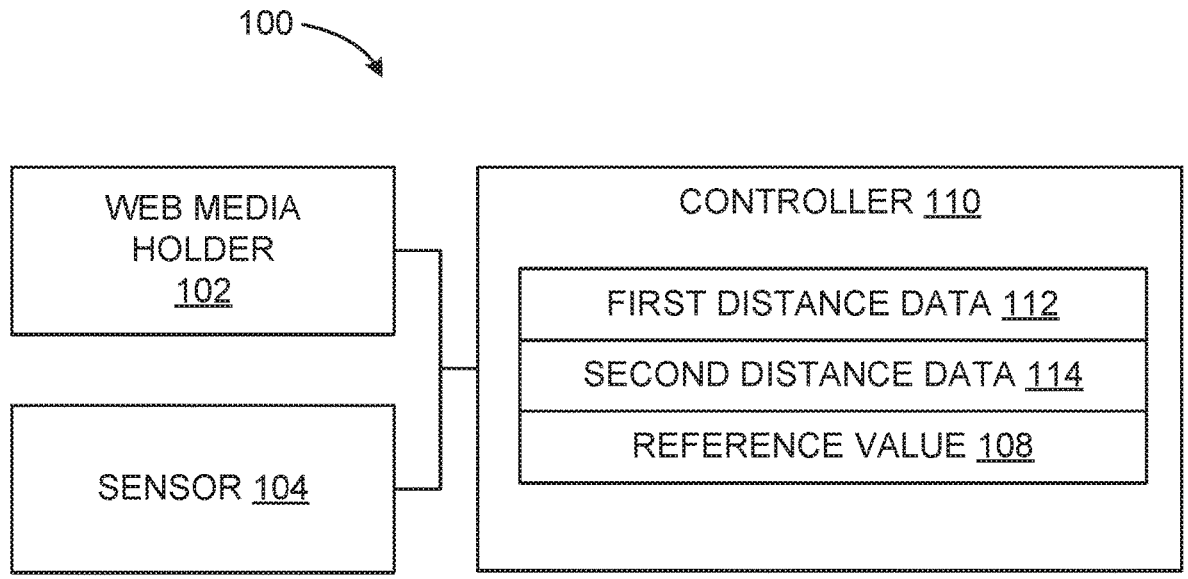
FIGS. 1 and 2 are block diagrams depicting example media handling systems.
Figure 2:
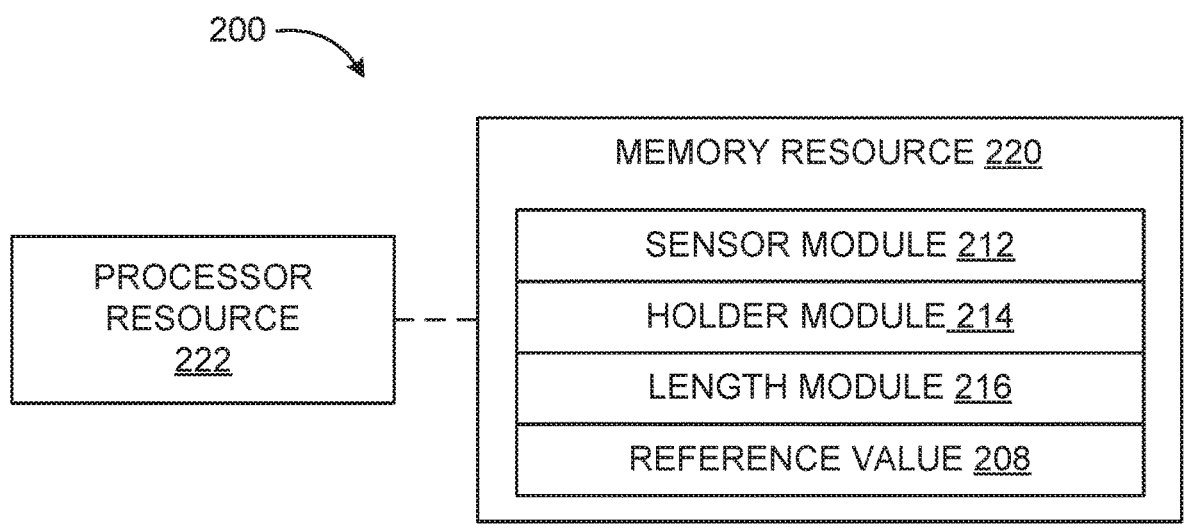

FIGS. 1 and 2 are block diagrams depicting example media handling systems 100 and 200. Referring to FIG. 1, the example media handling system 100 of FIG. 1 generally includes a web media holder 102, a sensor 104, and controller 110. In general, the controller 110 may use the sensor 104 to obtain distance readings (represented as first distance data 112 and second distance 114 in FIG. 1) regarding web media held by the web media holder 102 and determine a remaining length of media of the web media based on the reference value 108 corresponding to the size of the core of the web media.

The web media holder 102 includes a core hub that is coupleable to a core of a web media roll. For example, the core hub may be a spindle or a core coupling device in a spindle-less printing system. The core of a web media roll may be fixedly coupled to the core hub to ensure accurate rotation of the web media roll. The web media holder 102 may be a component of a print apparatus having a fluid ejection device within a print zone of the print apparatus where the media holder 102 is a portion of a media handling system 100 that guides media through the print apparatus to perform a print job.

The sensor 104 is any appropriate sensor that is capable to take a measurement at the circumferential surface of the web media roll, Example sensors include mechanical sensors, optical sensors, and the like. For example, the sensor 104 may be a mechanical sensor having an arm to contact the circumferential surface of the web media roll. For another example, the sensor 104 may be an ultrasonic sensor aligned to receive a signal in a direction corresponding to a rotational axis of the core hub. For yet another example, the sensor 104 may be an optical sensor aligned to receive a visual signal in the direction corresponding to the rotational axis of the core hub. A circumferential surface is a surface that extends along the width of the media roll and exists on the perimeter of the web media roll (e.g., on the exposed surface layer of the web media roll), which is different from the radial surface located on the sides of media roll (which exposes the sides a plurality of layers of web media on the roll).

The sensor 104 is capable of producing data corresponding to distance. For example, the sensor 104 is capable of producing a first data that represents a first distance measureable by the sensor 104 when the core hub is in a first orientation and capable of producing a second data that represents a second distance measureable by the sensor 104 when the core hub is in a second orientation after a number of rotations with respect to the first orientation of the core hub. The orientation represents a certain amount of rotation and may be greater than 360 degrees. In this manner, the sensor 104 retrieves distance data at different times (e.g., after the web media holder 102 rotates the web media roll) and provides the data to be compared by the controller 110.

The controller 110 may be any combination of circuitry and executable instructions to determine a length of the web media roll based on the sensor data 112 and 114 and a reference value 108 corresponding to the core of the web media roll. For example, the controller 110 may utilize a formula that uses a radial change between two distance measurements and the number of rotations between the changes to identify the amount of media available on the media roll (less the radial volume corresponding to the core of the web media roll).

The controller 110 may determine a thickness of the web media to use in determining the remaining length of the web media roll. For example, the controller 110 may cause the sensor to measure the first distance to the circumferential surface of the web media roll before the number of rotations are performed, cause the sensor to measure the second distance to the circumferential surface of the web media roll after the number of rotations are performed, and determine a thickness of the web media based on the number of rotations and a difference between the first distance and the second distance.

The controller 110 may use a length calculation that utilizes various attributes of the web media roll. For example, the controller 110 may determine the length of the web media roll based on the thickness of the web media, a core radius, a radius of the roll as measure by the sensor 104, a number of available rotations of the web media roll, and a distance between the web media roll and a print zone of a print apparatus on which the web media holder 102 resides. The controller 110 may be programmed to use a spiral length calculation to determining the length of the web media roll. An example spiral length formula may be an Archimedean spiral length formula such as $$s = \int_0^{2\pi N} \sqrt{\frac{h^2}{4\pi^2} + \left(R0 + \frac{h}{2\pi}\theta\right)^2} \, d\theta$$

where R0 is the radius of the roll core, h is the media thickness,

N is the number of turns the roll has (N may be determined by the difference between the radius of the roll and the radius of the core divided by the thickness h), d is the media distance between the roll and the print zone, and s is the media length remaining on the roll.

The controller 110 may control operations of the web media holder 102 and the sensor 104. For example, the controller 110 may operate the web media holder 102 to rotate a precise number of rotations to use in a formula computation for determining the remaining media length of the web media roll and control when the sensor 104 captures data. For example, the controller 110 may cause the sensor 104 to obtain a first data corresponding to a distance measurement from the sensor to the web media roll when oriented at a first rotational state, cause the core hub to rotate the web media roll in a first direction to orient the web media roll for the sensor to obtain the second data, cause the core hub to rotate in a second direction opposite the first direction to rewind the web media roll until the core hub is in the first orientation, compute the thickness based on the difference between the first data and the second data, cause the thickness of the media to be stored in a data structure representing a media profile, compute a remaining length of the web media roll using the Archimedean spiral length formula as discussed above, cause a length of the web media roll to be displayed on a user interface, and cause components of the media handling system to guide the web media to the print zone to be printed on by a fluid ejection system of the print apparatus.

The controller 110 may perform operations in the determination of the media length to compensate for conditions of the printer and other factors that may contribute to determining media length based on sensor input. For example, the environmental changes may be considered as well as the distance between the web media roll and the print platen. In the example of an optical sensor aligned to receive a signal from the core hub, the controller 110 utilizes a compensatory factor based on a reflection property of the web media to calculate the first distance and the second distance.

The controller 110 may be used to identify the reference value 108. For example, with a reference core with no media placed onto the media holder 102, the controller 110 may take distance measurement using the sensor 104, determine a reference value corresponding to a distance between the sensor and a surface of a core of the web media roll, compute a core radius, and store the reference value on a computer-readable medium to use in computing the remaining length of a web media roll.

Figure 3:
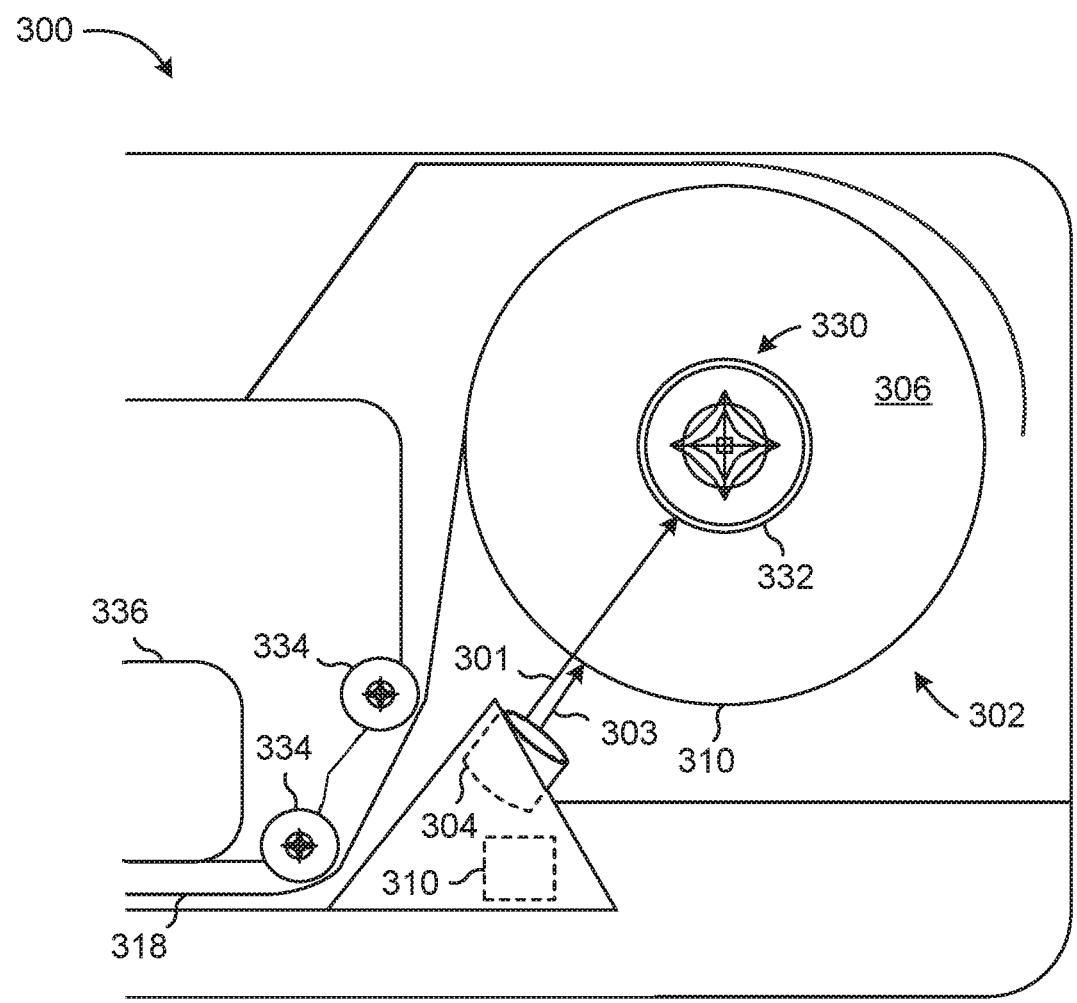
FIG. 3 depicts an example environment in which various media handling systems may be implemented.
Figure 4:
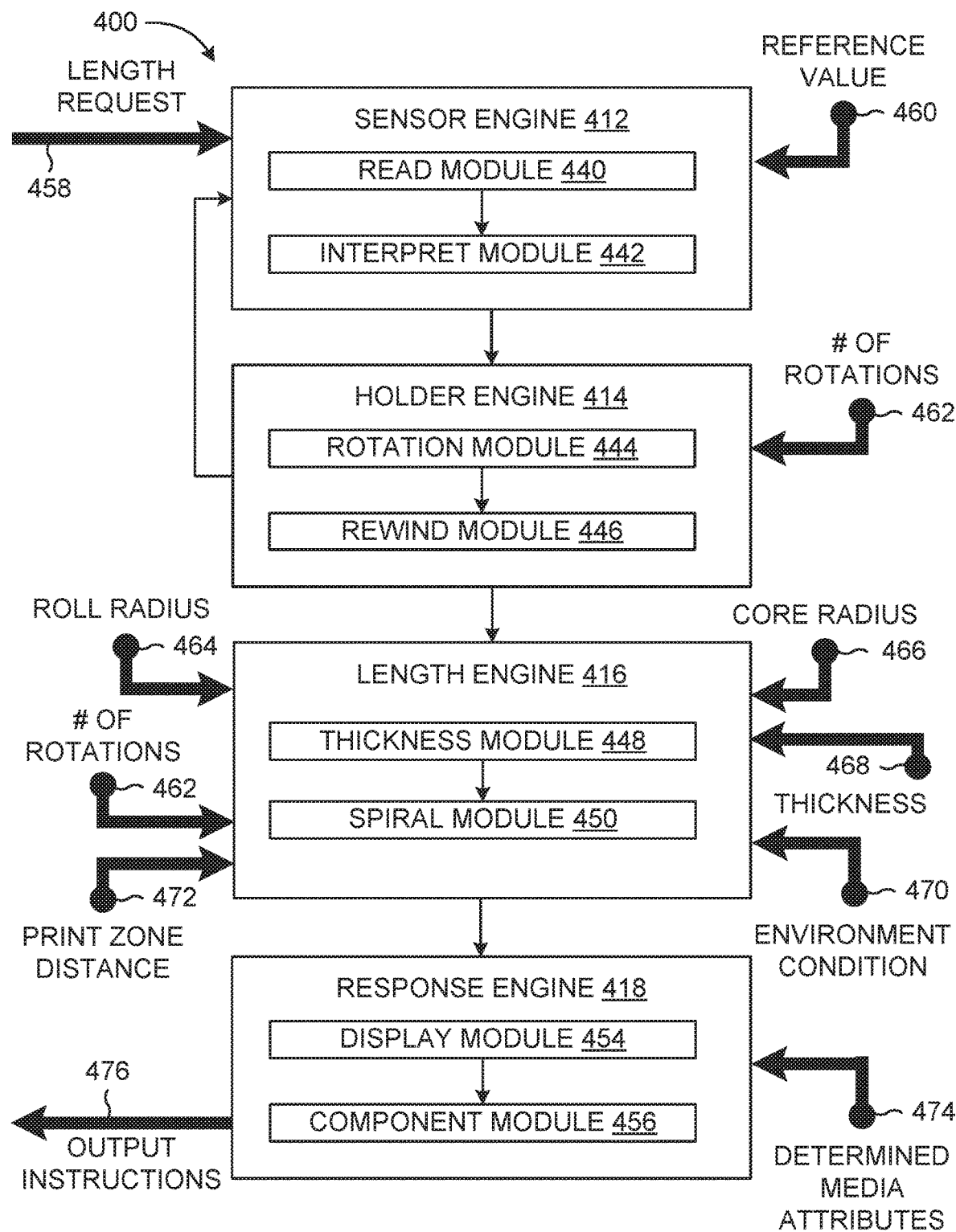
FIG. 4 depicts example modules used to implement example media handling systems.
Figure 5:
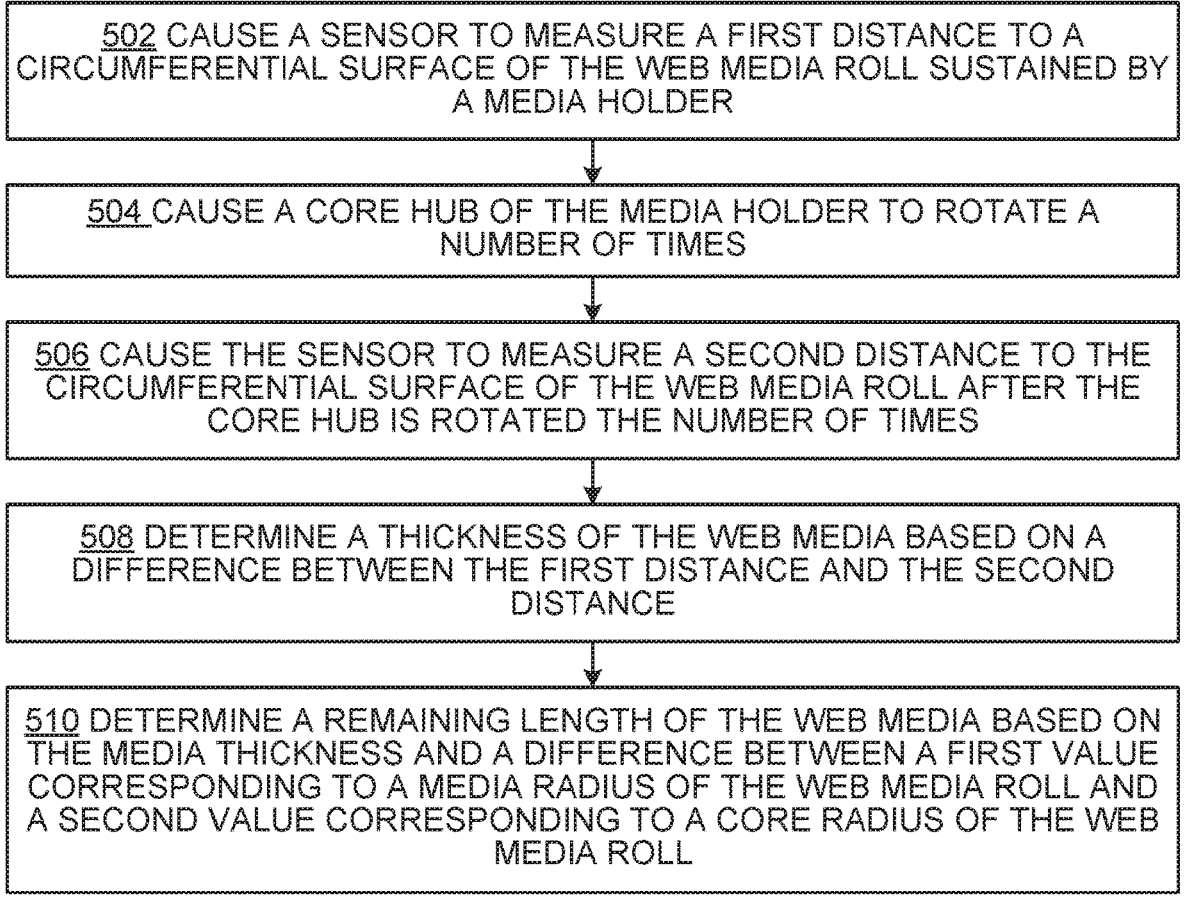
FIGS. 5 and 6 are flow diagrams depicting example methods of operating a print apparatus.
Figure 6:
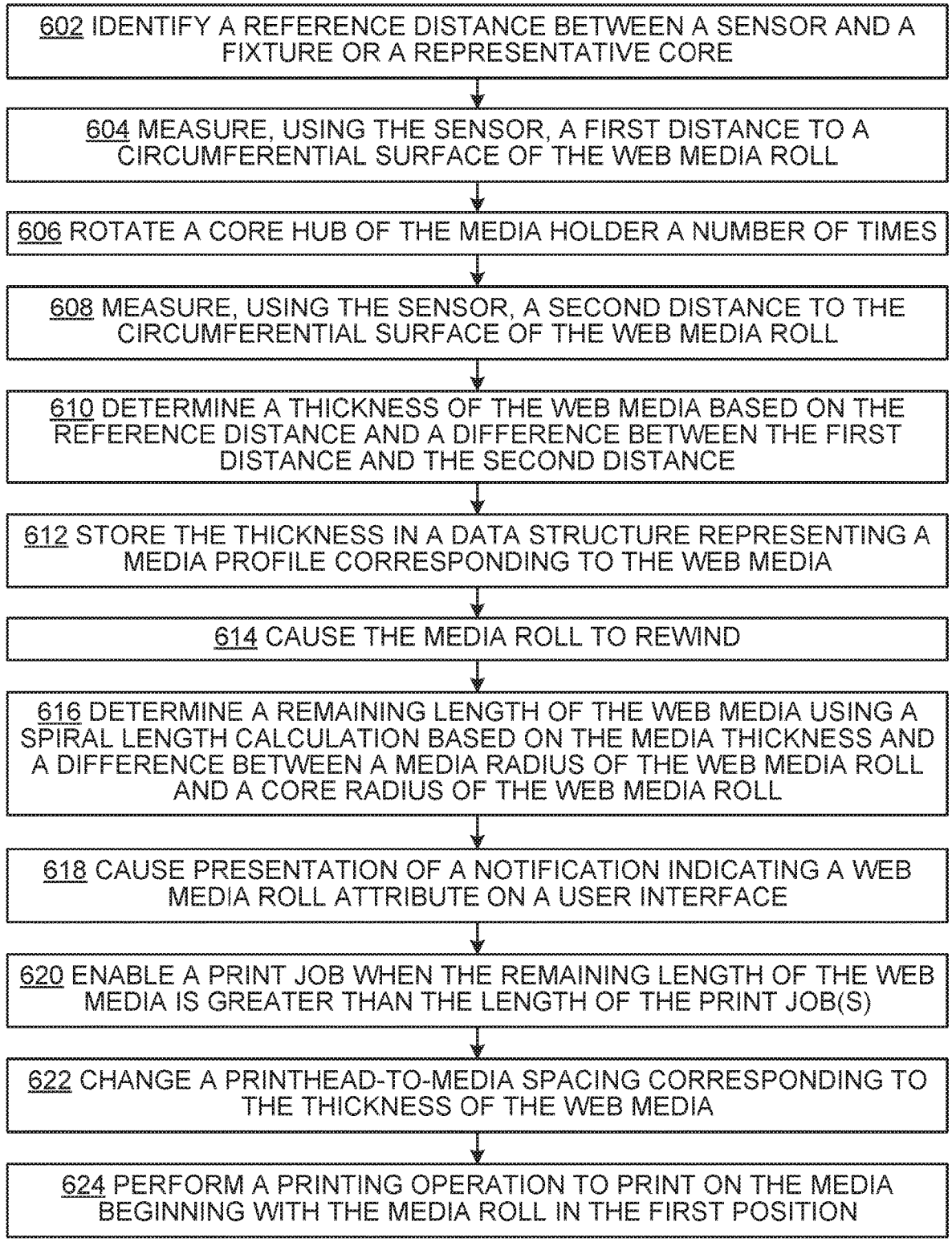

In some examples, functionalities described herein in relation to any of FIGS. 1-3 may be provided in combination with functionalities described herein in relation to any of FIGS. 4-6.

FIG. 2 depicts the example system 200 may comprise a memory resource 220 operatively coupled to a processor resource 222. Referring to FIG. 2, the memory resource 220 may contain a set of instructions that are executable by the processor resource 222. The memory resource 220 may also contain data useable by system 200 when executing the set of instructions, such as reference value 208 which is the same as reference value 108 of FIG. 1. The set of instructions are operable to cause the processor resource 222 to perform operations of the system 200 when the set of instructions are executed by the processor resource 222. For example, the controller 110 may include a processor resource 222 and a memory resource 220 with executable instructions on the memory resource 222 that when executed by the processor resource 222 cause the controller 110 to perform according to a control program. The set of instructions stored on the memory resource 220 may be represented as a sensor module 212, a holder module 214, and a length module 216. The sensor module 212 and the holder module 214 represent program instructions that when executed operate the sensor 104 and the web media holder 102 of FIG. 1, respectively. The length module 216 represents program instructions that when executed perform computations to determine remaining length of a web media roll coupled to a web media holder 102 of FIG. 1.

The processor resource 222 may carry out a set of instructions to execute the modules 212, 214, 216, and/or any other appropriate operations among and/or associated with the modules of the system 200. For example, the processor resource 222 may carry out a set of instructions to retrieve a first sensor data representing a first distance measurement corresponding to a circumferential surface of a web media roll when sustained by a media holder of a print apparatus, retrieve a second sensor data representing a second distance measurement corresponding to the circumferential surface of the web media roll when sustained by the media holder after the web media roll is rotated a number of times, and determine a length of the web media available of the web media roll based on a difference between the first distance measurement and the second distance measurement and the number of times of rotation of the web media roll between a time of the first distance measurement and a time of the second distance measurement. For another example, the processor resource 222 may carry out a set of instructions to divide a difference between a reference value and the first distance measurement by a thickness of the web media to identify a number of available rotations of the web media roll from when the core hub is at the first position, perform an integration of a calculation of the media thickness between the first distance measurement and a radial reference corresponding to the core of the web media roll, and adjust the integration based on a distance between the web media roll and a print zone of a print apparatus to determine the remaining length of the web media roll from the first position. For yet another example, the processor resource 222 may carry out a set of instructions to capture a first distance measurement, rotate the web media roll via the core hub of the web media holder from a first position to a second position, capture a second distance measurement, cause the media to rewind from the second position to the first position, determine a thickness of the media length based on the difference between distance measurements, determine a remaining length of the media based on the determined thickness, cause a print engine of the print apparatus to adjust a printhead-to-media spacing according to the thickness of the web media, and perform a printing operation to print on the media beginning with the media roll in the first position if the remaining length of the web media roll is greater than the length of the print job to be printed on the web media. For yet another example, the processor resource 222 may carry out a set of instructions to calculate a thickness of the web media based on the number of rotations and a difference between the first distance and the second distance, identify an environment condition classification corresponding to a print apparatus, store a first media data representing the thickness of the web media and a second media data representing the environment condition classification in a data structure corresponding to a media profile of the web media, and use the stored media data when determining the remaining length of the web media roll. For yet another example, the processor resource 222 may carry out a set of instructions to identify a reference value corresponding to a distance between the sensor and a surface of a core of the web media roll and store the reference value on a memory resource to be used in computing the remaining length of a web media roll.

Although these particular modules and various other modules are illustrated and discussed in relation to FIG. 2 and other example implementations, other combinations or sub-combinations of modules may be included within other implementations. Said differently, although the modules illustrated in FIG. 2 and discussed in other example implementations perform specific functionalities in the examples discussed herein, these and other functionalities may be accomplished, implemented, or realized at different modules or at combinations of modules. For example, two or more modules illustrated and/or discussed as separate may be combined into a module that performs the functionalities discussed in relation to the two modules. As another example, functionalities performed at one module as discussed in relation to these examples may be performed at a different module or different modules. FIG. 4 depicts yet another example of how functionality may be organized into modules.

A processor resource is any appropriate circuitry capable of processing (e.g., computing) instructions, such as one or multiple processing elements capable of retrieving instructions from a memory resource and executing those instructions. For example, the processor resource 222 may be a central processing unit (CPU) that enables determining a remaining length of a web media roll by fetching, decoding, and executing modules 212, 214, and 216. Example processor resources include at least one CPU, a semiconductor-based microprocessor, a programmable logic device (PLD), and the like. Example PLDs include an application specific integrated circuit (ASIC), a field-programmable gate array (FPGA), a programmable array logic (PAL), a complex programmable logic device (CPLD), and an erasable programmable logic device (EPLD). A processor resource may include multiple processing elements that are integrated in a single device or distributed across devices. A processor resource may process the instructions serially, concurrently, or in partial concurrence.

A memory resource represents a medium to store data utilized and/or produced by the system 200. The medium is any non-transitory medium or combination of non-transitory media able to electronically store data, such as modules of the system 200 and/or data used by the system 200. For example, the medium may be a storage medium, which is distinct from a transitory transmission medium, such as a signal. The medium may be machine-readable, such as computer-readable. The medium may be an electronic, magnetic, optical, or other physical storage device that is capable of containing (i.e., storing) executable instructions. A memory resource may be said to store program instructions that when executed by a processor resource cause the processor resource to implement functionality of the system 200 of FIG. 2. A memory resource may be integrated in the same device as a processor resource or it may be separate but accessible to that device and the processor resource. A memory resource may be distributed across devices.

In some examples, the system 200 may include the executable instructions may be part of an installation package that when installed may be executed by a processor resource to perform operations of the system 200, such as methods described with regards to FIGS. 4-6. In that example, a memory resource may be a portable medium such as a compact disc, a digital video disc, a flash drive, or memory maintained by a computer device, such as a server, from which the installation package may be downloaded and installed. In another example, the executable instructions may be part of an application or applications already installed. A memory resource may be a non-volatile memory resource such as read only memory (ROM), a volatile memory resource such as random access memory (RAM), a storage device, or a combination thereof. Example forms of a memory resource include static RAM (SRAM), dynamic RAM (DRAM), electrically erasable programmable ROM (EEPROM), flash memory, or the like. A memory resource may include integrated memory such as a hard drive (HD), a solid state drive (SSD), or an optical drive.

FIG. 3 depicts an example environments in which various example media handling systems may be implemented. The print apparatus 300 generally includes a web media roll 306 coupled to a web media holder 302 via a core hub 330. As the core hub 330 rotates, the web media roll 306 rotates and media 318 moves into the print zone (or out of the print zone depending on the direction of rotation of the core hub) below the printhead device 336 with assistance by media handling components (e.g., rollers 334). The controller 310 operates the core hub 330 and sensor 304 to coordinate distance measurements and rotations of the web media roll 306. The distance 301 between the sensor 304 and the core 332 may be a known distance or a calculated distance using an empty media roll (e.g., a reference core) or a fixture reference point, such as an edge of the core hub. The distance 303 represents the distance measured by the sensor 304 to the web media roll circumferential surface 310 at any given time and/or any given rotation amount of the web media roll 306 as determined by the controller 310.

FIG. 4 depicts example modules used to implement example media handling systems 400. Referring to FIG. 4, the example modules of FIG. 4 generally include a sensor engine 412, a holder engine 414, a length engine 416, and a response engine 418. The example modules of FIG. 4 may be implemented on a compute device, such as a print apparatus or a print server. The engines 312, 314, 316, and 318 may be integrated via circuitry or as installed instructions into a memory resource of the print apparatus from a print server, for example.

The sensor engine 412 represents any circuitry or combination of circuitry and executable instructions to operate a sensor to capture measurement data corresponding to a web media roll. In response to receiving a length determination request 458 (such as upon loading a used roll of web media), the sensor engine 412 may capture a distance reading using a sensing component. The sensor engine 412 may also be activated to perform a reference value determination request to determine the reference value 460 corresponding to the core of the web media roll. The sensor engine 412 includes program instructions, such as a read module 440 and an interpret module 442, to assist capturing media roll data. The read module 440 represents program instruction that when executed cause a processor resource to operate a sensor to obtain data. The interpret module 442 represents program instructions that when executed cause a processor resource to determine a web media roll radius using the data obtained by executing the read module 440. The interpreted data is provided to the length engine 416 for use in determining the length of media of the media roll.

The holder engine 414 represents any circuitry or combination of circuitry and executable instructions to operate a web media holder. The holder engine 414 includes program instructions, such as a rotation module 444 and a rewind module 446, to assist operation of the web media holder. The rotation module 444 represents program instructions that when executed cause a processor resource to actuate rotation of a core hub of a web media holder a number of rotations 462, which may be a predetermined number of rotations and then actuate the sensor engine 412 to capture further data after the number of rotations 462 are completed. The rewind module 446 represents program instructions that when executed cause a processor resource to actuate rotation of the core hub to rewind the web media roll to the original position (e.g., rewind the same number of rotations performed by executing the rotation module 444).

The length engine 416 represents any circuitry or combination of circuitry and executable instructions to determine a length of web media roll. The length engine 416 includes program instructions, such as a thickness module 448 and a spiral module 450, to assist determination of the remaining length of media of web media roll. The thickness module 448 represents program instructions that when executed cause a processor resource to compute a thickness of the web media using a difference between distance measurements before and after the number of rotations 462. The spiral module 450 represents program instructions that when executed cause a processor resource to insert variables including the number of rotations 462, the roll radius 464, the core radius 466, the thickness 468 of the web media, the environment condition 470, and the print zone distance 472 into a spiral length formula to determine a remaining length of web media on a roll. An environment condition 470 may include a classification of an environment attribute. For example, a temperature sensor may identify a temperature level associated with the conditions of the thickness of the media. For another example, a humidity sensor may identify a degree of humidity in the printer environment and associate the humidity classification with the thickness (e.g., when the thickness data is stored). The remaining length as determined by the length engine 416 is provided to the response engine 418 to present the remaining length to the user and make adjustments to a print apparatus corresponding to the remaining length.

The response engine 418 represents any circuitry or combination of circuitry and executable instructions to update a print apparatus according to a determination of remaining length of a web media roll. The response engine 418 includes program instructions, such as a display module 454 and a component module 456, to assist adjustments of a print apparatus according to the remaining media length determination. The display module 454 represents program instructions that when executed cause a processor resource to instruct a display coupled to a print apparatus to show a remaining length of the web media. The display module 454, when executed, may also cause a processor resource to instruct a display to present other determined media attributes 474, such as the thickness of the web media. The component module 456 represents program instructions that when executed cause a processor resource to instruction a component of a print apparatus to adjust based on the determined media attributes 474, such as the media length and media thickness. For example, a processor resource that executes the component module 456 may cause a printhead carriage or a platen to move to change a printhead-to-media spacing according to the thickness of the media as determined by executing the thickness module 448. The response engine 418 provides the prepared output instructions 476 to the proper destinations, such as a controller for a display or other print apparatus component controllers.

In the discussion herein, the systems 100, 200, 300, and 400 have been described as circuitry or a combination of circuitry and executable instructions. Such components may be implemented in a number of fashions. Looking at FIG. 2, the executable instructions may be processor-executable instructions, such as program instructions, stored on the memory resource 220, which is a tangible, non-transitory computer-readable storage medium, and the circuitry may be electronic circuitry, such as processor resource 222, for executing those instructions. The instructions residing on a memory resource may comprise any set of instructions to be executed directly (such as machine code) or indirectly (such as a script) by a processor resource.

Referring to FIGS. 1-4, the engines and/or the modules discussed herein may be distributed across devices, such as print apparatus and print servers. The engine and/or modules may complete or assist completion of operations performed in describing another engine and/or module. For example, the length engine 416 of FIG. 4 may request, complete, or perform the methods or operations described with the sensor engine 412, the holder engine 414, the length engine 416, and the response engine 418. Thus, although the various engines and modules are shown as separate engines in FIGS. 1, 2, and 4, in other implementations, the functionality of multiple engines and/or modules may be implemented as a single engine and/or module or divided in a variety of engines and/or modules. In some example, the engines of the system 400 may perform example methods described in connection with FIGS. 5-6.

FIGS. 5 and 6 are flow diagrams depicting example methods of operating a print apparatus. Referring to FIG. 5, example methods of operating a print apparatus may generally comprise causing a sensor to measure a first distance, causing a web media roll to rotate a number of times, causing the sensor to measure a second distance, determining a thickness of the web media, and determining a remaining length of the web media. The method of FIGS. 5 and 6 are performable by engines and modules discussed herein, such as the engines of FIG. 4.

At block 502, a sensor is actuated to measure a first distance to a circumferential surface of the web media roll sustained by a media holder, At block 504, a core hub of the media holder is rotated a number of times.

At block 506, the sensor is actuated to measure a second distance to the circumferential surface of the web media roll after the core hub is rotated the number of times.

At block 508, a thickness of the web media is determined based on a difference between the first distance obtained by the sensor at block 502 and the second distance obtained by the sensor at block 506.

At block 510, a remaining length of the web media is determined based on the media thickness determined at block 508 and a difference between a first value corresponding to a media radius of the web media roll and a second value corresponding to a core radius of the web media roll. For example, the remaining length of the web media roll is calculated based on a spiral length calculation and a distance between the web media roll and the print zone along the media path. The remaining length may be calculated with respect to when the print area of the web media is at the print zone of a print apparatus.

FIG. 6 includes blocks similar to blocks of FIG. 5 and provides additional blocks and details. In particular, FIG. 6 depicts additional blocks and details generally regarding identifying a reference distance corresponding to a core of web media, storing a thickness determination, rewinding the media, presenting information based on the remaining length determination, changing a printhead-to-media spacing, and performing a print operation. Blocks 604, 606, 608, 610, and 616 are the same as blocks 502, 504, 506, 508, and 510 of FIG. 5 and, for brevity, their respective descriptions are not repeated.

At block 602, a reference distance between the sensor and a fixture or a representative core is identified. For example, prior to loading a web media roll, the sensor may make a reference value capture of the fixture or representative core (e.g., a media core without media attached). The fixture or representative core may be less affected by an environment condition than the web media to assist in accurate reference values. The fixture or representative core is to be aligned with the sensor to produce a distance reading by the sensor in the direction of a rotational axis of the core hub. The reference distance may be used at block 610 to determine the thickness of the web media and/or block 616 to determine the remaining length of the web media. At block 612, the thickness value of the media is stored in a data structure representing a media profile corresponding to the web media.

At block 614, the web media is rewound. For example, the web roll may be rewound to an accurate beginning location to compensate for any rotations of blank media performed during operations discussed herein to obtain the remaining length of the web media.

At block 618, information is displayed on a user interface. For example, a notification is caused to be presented on a user interface about the remaining length of web media of the web media roll. For another example, a notification is caused to be presented on the user interface indicating that the print job is greater than the remaining length of web media of the web media roll when the length of the print job is greater than the remaining length of web media of the web media roll. Other displayable information may include determined media attributes, environment condition classifications, a number of print jobs, a printhead-to-media spacing, a number of rotations until the core is reached by the sensor, and/or any other information discussed herein.

At block 620, a print job is enabled to occur when the remaining length of web media of the web media roll is greater than the length of a print job. If the remaining length of the web media roll is less than the length of the print job, then the print job may be cancelled or paused and the user notified of such via a user interface.

At block 622, a printhead carriage or a platen is caused to be moved to a printhead-to-media spacing corresponding to the thickness of the web media. For example, if the thickness determined at block 612 is greater than the current printhead-to-media spacing, the print apparatus may cause a media handling component or a component of the fluid ejection system to move to accommodate the thickness of the media.

At block 624, a printing operation to print on the media is performed. The printing operation may begin with the media roll in the first position when the sensor obtained distance data at block 604. The core hub may be caused to rotate the media holder as a print area of the web media is guided to a print zone of the print apparatus in preparation to receive print fluid as ejected by a fluid ejection system. A plurality of print jobs may be caused to be printed. For example, the remaining length of web media may be compared to a cumulative amount of media to complete a queue of print jobs and the plurality of print jobs may be printed when the remaining length of the web media is greater than a cumulative media length of the plurality of print jobs. If the remaining length of the web media is less than a cumulative media length of the plurality of print jobs, a notification may be presented via user interface indicating that there is insufficient media to complete all the remaining print jobs and some or all of the print jobs may be cancelled or paused. In this manner, the user of a print apparatus may make determinations of which media rolls are capable of handling a print job (or multiple print jobs) and exchange out media rolls that are unable to accommodate the entirety of a print job. A user may also be able to confidently utilize used media rolls by, via the systems discussed herein, providing the remaining length of the web media and/or providing the comparison of the remaining length to the expected length of a print job via the user interface.

Although the flow diagrams of FIGS. 4-6 illustrate specific orders of execution, the order of execution may differ from that which is illustrated. For example, the order of execution of the blocks may be scrambled relative to the order shown. Also, the blocks shown in succession may be executed concurrently or with partial concurrence. All such variations are within the scope of the present description.

All of the features disclosed in this specification (including any accompanying claims, abstract and drawings), and/or all of the elements of any method or process so disclosed, may be combined in any combination, except combinations where at least some of such features and/or elements are mutually exclusive.

The terms "include," "have," and variations thereof, as used herein, mean the same as the term "comprise" or appropriate variation thereof. Furthermore, the term "based on," as used herein, means "based at least in part on." Thus, a feature that is described as based on some stimulus may be based only on the stimulus or a combination of stimuli including the stimulus.

The present description has been shown and described with reference to the foregoing examples. It is understood, however, that other forms, details, and examples may be made without departing from the spirit and scope of the following claims. The use of the words "first," "second," or related terms in the claims are not used to limit the claim elements to an order or location, but are merely used to distinguish separate claim elements.

What is claimed is:

1. A media handling system comprising:
a web media holder including a core hub, the core hub coupleable to a core of a web media roll;
a sensor to take a measurement at the circumferential surface of the web media roll; and
a controller to determine a length of the web media roll based on:
a first data that represents a first distance measurable by the sensor when the core hub is in a first orientation;
a second data that represents a second distance measureable by the sensor when the core hub is in a second orientation after a number of rotations with respect to the first orientation of the core hub;
a third data that represents a reference value corresponding to the core; and
a spiral length calculation based on a thickness of the web media, a core radius, a radius of the web media roll as measured by the sensor, a number of available rotations of the web media roll, and a third distance between the web media roll and a print zone of a print apparatus of which the media handling system is a component.

2. The system of claim 1, wherein the controller is to:
cause the sensor to measure the first distance to the circumferential surface of the web media roll before the number of rotations are performed;
cause the sensor to measure the second distance to the circumferential surface of the web media roll after the number of rotations are performed; and
determine the thickness of the web media based on the number of rotations and a difference between the first distance and the second distance.

3. The system of claim 1, wherein:
the media handling system is a component of the print apparatus.

4. The system of claim 1, wherein:
the core of the web media roll is fixedly coupled to the core hub;
the controller is to cause the core hub to rotate the web media roll in a first direction to orient the web media roll for the sensor to obtain the second data;
the controller is to cause the core hub to rotate in a second direction opposite the first direction to rewind the web media roll until the core hub is in the first orientation;
the controller is to cause the thickness of the media to be stored in a data structure representing a media profile;
the controller is to cause a length of the web media roll to be displayed on a user interface; and
the media handling system is to guide the web media to the print zone to be printed on by a fluid ejection system of the print apparatus.

5. The system of claim 1, wherein the sensor is:
a mechanical sensor having an arm to contact the circumferential surface of the web media roll;
an ultrasonic sensor aligned to receive a signal in a direction corresponding to a rotational axis of the core hub; or
an optical sensor aligned to receive a signal in the direction corresponding to the rotational axis of the core hub, wherein the controller utilizes a compensatory factor based on a reflection property of the web media to calculate the first distance and the second distance.

6. A non-transitory computer-readable storage medium comprising a set of instructions executable by a processor resource to:
retrieve a first sensor data representing a first distance measurement corresponding to a circumferential surface of a web media roll when sustained by a media holder of a print apparatus;
retrieve a second sensor data representing a second distance measurement corresponding to the circumferential surface of the web media roll when sustained by the media holder after the web media roll is rotated a number of times;
determine a length of the web media available of the web media roll based on:
a difference between the first distance measurement and the second distance measurement; and
the number of times of rotation of the web media roll between a time of the first distance measurement and a time of the second distance measurement;
calculate a thickness of the web media based on the number of rotations and a difference between the first distance and the second distance;
identify an environment condition classification corresponding to a print apparatus; and
store a first media data representing the thickness of the web media and a second media data representing the environment condition classification in a data structure corresponding to a media profile of the web media.

7. The medium of claim 6, wherein the set of instructions is executable by the processor resource to:
identify a reference value corresponding to a distance between the sensor and a surface of a core of the web media roll; and
store the reference value on the computer-readable medium.

8. The medium of claim 6, wherein the set of instructions is executable by the processor resource to:
divide a difference between a reference value and the first distance measurement by the thickness of the web media to identify a number of available rotations of the web media roll from when the core hub is at the first position;
perform an integration of a calculation of the media thickness between the first distance measurement and a radial reference corresponding to the core of the web media roll; and
adjust the integration based on a distance between the web media roll and a print zone of a print apparatus to determine the remaining length of the web media roll from the first position.

9. The medium of claim 8, wherein the set of instructions is executable by the processor resource to:
cause the media to rewind from the second position to the first position;
cause a print engine of the print apparatus to adjust a printhead-to-media spacing according to the thickness of the web media; and
perform a printing operation to print on the media beginning with the media roll in the first position.

10. A method of operating a print apparatus, the method comprising:
causing a sensor to measure a first distance to a circumferential surface of the web media roll sustained by a media holder;

causing a core hub of the media holder to rotate a number of times;

causing the sensor to measure a second distance to the circumferential surface of the web media roll after the core hub is rotated the number of times;

determining a thickness of the web media based on a difference between the first distance and the second distance;

determining a remaining length of the web media based on the media thickness and a difference between a first value corresponding to a media radius of the web media roll and a second value corresponding to a core radius of the web media roll;

causing the thickness to be stored in a data structure representing a media profile corresponding to the web media; and causing presentation of a notification on a user interface about the remaining length of web media of the web media roll.

11. The method of claim 10, comprising:

enabling a print job to occur when the remaining length of web media of the web media roll is greater than the length of a print job; and causing presentation of a notification on the user interface indicating that the print job is greater than the remaining length of web media of the web media roll when the length of the print job is greater than the remaining length of web media of the web media roll.

12. The method of claim 10, comprising:

causing the core hub to rotate the media holder as a print area of the web media is guided to a print zone of the print apparatus;

calculating a remaining length of the web media roll when the print area of the web media is at the print zone, the remaining length calculated based on a spiral length calculation and a distance between the web media roll and the print zone along the media path; and causing a plurality of print jobs to be printed when the remaining length of the web media is greater than a cumulative media length of the plurality of print jobs or causing presentation of a notification on the user interface when the remaining length of the web media is less than a cumulative media length of the plurality of print jobs.

13. The method of claim 10, comprising:

identifying a reference distance between the sensor and a fixture or a representative core, the fixture or representative core to be less affected by an environment condition than the web media and aligned with the sensor to produce a distance reading by the sensor in the direction of a rotational axis of the core hub;

using the reference distance to determine the thickness of the web media;

causing a printhead carriage or a platen to move to a printhead-to-media spacing corresponding to the thickness of the web media.

\* \* \* \* \*